Patented Feb. 25, 1941

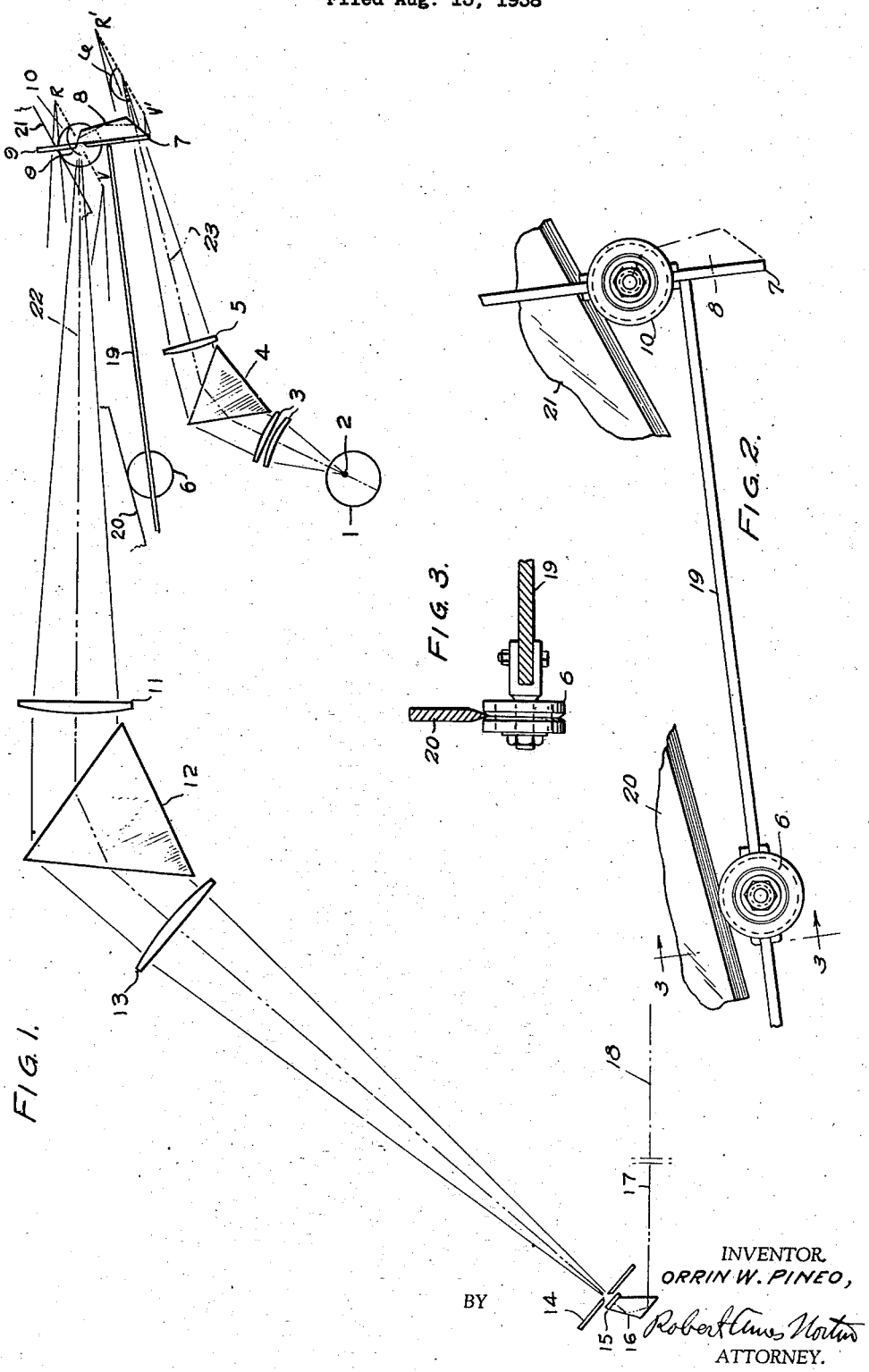

2,233,062

UNITED STATES PATENT OFFICE 2,233,062

MONOCHROMATOR

Orrin Weston Pineo, Milo, Maine, assignor, by mesne assignments, to American Cyanamid Company, New York, N. Y., a corporation of Maine Application August 13, 1938, Serial No. 224,738

5 Claims. (Cl. 240—1)

This invention relates to monochromators and more particularly to those of the double monochromator type.

In the past, two types of double monochromator have attained practical importance. The first is the conventional type originated by van Cittert in which the light from the light source passes through an entrance slit, then through a prism with two lenses, through a third lens to an intermediate slit and finally through a second highly corrected prism and lens system to an exit slit. This type of monochromator requires high grade achromatic lenses and is mechanically very awkward because the travel of the light is in the same direction, making an extremely long device. This type of monochromator, however, does have one real advantage; namely, the deviations of the two prisms compensate for each other at a finite middle slit and the apex of one prism is imaged on the base of the other prism so that the length of travel of the light through two prisms is uniform over the aperture of the system.

The serious mechanical disadvantages of the van Cittert type double monochromator led to the development of a compact double monochromator by Adam Hilger, Ltd., of London in which light, after passing through the first prism, is reflected from a mirror where the finite middle slit is formed, then sent to the second prism and thence to an exit slit. A device is thus obtained which is approximately half as long as the van Cittert type of monochromator and shifting of the band of light at the exit slit through the spectrum is comparatively simple by mechanical movement of the mirror and an associated jaw which defines the middle slit. The Hilger type of double monochromator is in common use and is standard equipment in recording spectrophotometers sold by the General Electric Company. In spite of its many mechanical advantages, the Hilger type of double monochromator is open to very serious optical faults. In the first place the apex of one prism is focussed on the apex of the other. The distance the light travels through the glass prisms varies, therefore, across the prism face, producing a shading of illumination across the aperture of the instrument in spectral regions where the light is somewhat absorbed by the prisms. An even more serious disadvantage results from the fact that the deviations by the mirror are not symmetrical for a finite middle slit and therefore the entrance slit has to be three times as large as the exit slit, thus requiring a relatively large source of light with corresponding inefficiency because of the difficulty of obtaining high intensity light sources of this type. There is also a certain inconvenience due to the fact that the middle slit must be straight and the entrance and exit slits therefore curved for most accurate results.

The double monochromator of the present invention possesses all of the mechanical advantages of the Hilger reflecting type with the optical advantages of the van Cittert type and in addition, permits obtaining the same accuracy with somewhat cheaper optical parts. According to the present invention, light from a light source is passed through a prism serving as a rough filter monochromator, which may be smaller and less perfect optically, and is then reflected a plurality of times, the last reflection imaging the spectrum on a middle slit which may be slightly curved. After passing through the middle slit, the roughly filtered light strikes a second prism, in such a way that the apex of the first prism is imaged on the base of the second and vice versa, and thence passes through an exit slit. Here, if desired, further reflection can be effected if the mechanical construction of the device makes a change in light direction desirable.

While the reflections may be effected in any suitable manner, I prefer to use total internal reflection in a prism rather than a silvered mirror and this constitutes the preferred modification of the invention. Similarly, I prefer to use a slightly curved middle slit although the error introduced by a straight middle slit is small and can be tolerated where utmost economy of construction is desired.

The monochromator of the present invention combines the advantages of both Hilger and van Cittert monochromators without any of the disadvantages of either. Thus, it is more compact than the Hilger monochromator. In its preferred form, no silvered mirror is employed, but rather total internal reflection, so that no discrimination is effected due to any non-uniform reflection of any spectral colors. Deviations in the two prisms compensate each other as in the case of the van Cittert type of monochromator and therefore a light source and entrance slit of minimum size may be used. This results in a marked increase of efficiency of light utilization. The middle slit may be slightly curved to permit a straight exit slit and source, and is nearly normal to the beam, as in the van Cittert monochromator. A less expensive first prism and associated optics is usable and expensive achromatic collimating lenses which are necessary in the van Cittert type of monochromator can be dispensed with. The fact that the filament image is on the slit and not on the prism is likewise an advantage since the prism is then uniformly illuminated.

The invention will be described in conjunction with the drawing in which:

Fig. 1 is a diagrammatic illustration of the monochromator of the present invention;

Fig. 2 is a side elevation on an enlarged scale partially broken away; and

Fig. 3 is a detailed sectional view taken along the line 3—3 of Fig. 2.

A source of light, commonly a filament 2 enclosed in a bulb 1, sends a beam of light through the collimating lenses 3 onto the prism 4, thence through the lens 5 and lens 7 to the total reflecting prism 8. This prism is carried by the slit 9 which is constrained to follow the line V—R by the grooved ball bearing 10 running along the knife edge 21. Lenses 3 are focussed, by lens 7 and prism 8, onto lens 13 throughout the traverse of slit 9 by slight rotation of slit 9 about its axis. This rotation is effected by the grooved ball bearing 6 carried by the light shield 19 and which runs on the knife edge 20 set slightly out of parallel with knife edge 21.

It will be noted that the light is reflected three times in the prism 8 imaging the spectrum V'—R' along the line V—R. Light from the slit 9 passes through the collimator lens 11 which is a simple lens, through the prism 12, the lens 13 and the exit slit 14 and finally through the lens 15 into the total reflecting prism 16 which folds back the path of light to produce additional compactness. To move the band of light through the spectrum the slit 9 is moved along the line V—R, this being the spectrum image of slit 14 by elements 11, 12 and 13. This motion can be produced by any of the mechanisms commonly employed in monochromators, and a slight rotational motion about the length of the slit is automatically provided so that the lens 7 images the lenses 3 exactly onto lens 13 for economy of light. The angles $\theta$ and $\phi$, by which the spectra V—R and V'—R' are oblique to the transmitted beam, depend on the constants of the material forming the prisms and lenses. It will be noted that the filter prism 4 is smaller than the prism 12. This permits greater economy and at the same time makes its spectrum more oblique as is shown ($\phi<\theta$) to give a little separation between the center line 22 and the center line 23. When the angle $\phi$ is about half that of $\theta$, the collimator 5 should have one half the focal length of the collimator 11 and the prism 4 should be about one half as big as prism 12. The collimators 3, a doublet lens, have a focus one third that of 5, giving a magnification of three times between the filament 2 and its image in the spectrum V'—R'. To maintain constant frequency range of transmitted light, the slits 9 and 14 must vary in width only about 2½ to 1 through the spectrum. Therefore, no entrance slit is needed in the filter monochromator and the filament itself can be used for a slit by selecting a proper magnification through proper obliquity of the spectrum V'—R'. Slight adjustment of obliquity can be made in assembly by twisting the lens 5 so that the light does not pass through it quite normally. In the filter monochromator this is not harmful and provides means for slight adjustment. The middle slit 9 should be slightly curved so as to use a straight filament 2 and straight exit slit 14 and the light passes through it nearly normally. The curvature is so slight that it is not apparent on the drawing.

By providing for a small entrance slit, which can be formed by the filament itself, it is possible to use motion picture sound track exciter lamps which are excellently suited to this purpose. Efficiency is still further increased by the smaller absorption resulting from the smaller size of the filter prism 4. The over-all efficiency of light utilization of the device is several times that of a Hilger type of monochromator.

While it is an advantage of the present invention that, with available light sources suitably magnified by choice of obliquity of the spectra, it is possible to dispense with physical structure forming an entrance slit, such structure may be included in all cases where the light source is not so chosen as to permit dispensing with entrance slit defined by physical structure.

What I claim is:

1. A double monochromator comprising in optical alignment a narrow band source of light, prismatic dispersing means, a plurality of reflectors, a selector slit, a second prismatic dispersing means and an exit slit, means including said plurality of reflectors and selector slit between the prismatic dispersing means for imaging the apex of one prism on the base of the other and means for moving the reflectors and selector slit so as to cause the band of light issuing from the exit slit to traverse the spectrum.

2. A double monochromator comprising in optical alignment a narrow band source of light, prismatic dispersing means, prismatic total reflecting means causing a plurality of reflections, a selector slit, a second prismatic dispersing means and an exit slit, means including said prismatic total reflecting means and selector slit between the prismatic dispersing means for imaging the apex of one prism on the base of the other and means for moving the reflecting means and selector slit so as to cause the band of light issuing from the exit slit to traverse the spectrum.

3. A monochromator according to claim 2 in which the first prism is smaller than the second prism.

4. A monochromator according to claim 2 in which the middle slit is curved.

5. A monochromator according to claim 2 in which the light source has the shape of a slit and is at such distance from the first prismatic dispersing means as to obviate the use of a slit between the light source and the first prism.

ORRIN WESTON PINEO.